US006671160B2

(12) United States Patent
Hayden

(10) Patent No.: US 6,671,160 B2
(45) Date of Patent: Dec. 30, 2003

(54) ESD PREVENTION DEVICE ENABLED LATCH

(75) Inventor: Douglas Todd Hayden, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 364 days.

(21) Appl. No.: 09/811,078

(22) Filed: Mar. 16, 2001

(65) Prior Publication Data

US 2002/0131227 A1 Sep. 19, 2002

(51) Int. Cl.[7] .................... H02H 1/00

(52) U.S. Cl. .................... 361/212; 361/220; 439/138

(58) Field of Search .................... 361/212, 220; 439/138, 148, 301, 342, 137, 181

(56) References Cited

U.S. PATENT DOCUMENTS 4,373,175 A 2/1983 Mykkanen .................. 361/220
4,722,025 A 1/1988 Robinson .................. 361/212
4,745,517 A * 5/1988 Pitts .................. 361/212
5,372,515 A 12/1994 Miller et al. .................. 439/138
6,198,040 B1 * 3/2001 Desousa et al. .......... 174/35 R

* cited by examiner

*Primary Examiner*—Stephen W. Jackson
*Assistant Examiner*—James A Demakis

(57) ABSTRACT

An electrostatic discharge prevention device enabled latch may be employed on or with an enclosure including an access panel. The electrostatic discharge prevention device enabled latch includes a latch for retaining the access panel in a closed position. The latch may be disengaged by operation of a latch release member which functions to effect release or disengagement of the latch. A conductor receptacle is attached to the enclosure, typically in the proximity of the access panel. An electrostatic discharge prevention device including a ground strap and a conductive terminal are provided for use by an individual desiring to gain access through the access panel to service enclosed components or circuits. When the conductive terminal is inserted into the conductor receptacle, a latch release member is displaced disengaging the latch.

10 Claims, 4 Drawing Sheets

ESD PREVENTION DEVICE ENABLED LATCH

BACKGROUND OF THE INVENTION

1. Technical Field

The present invention relates generally to latching devices and more particularly to an electrostatic discharge prevention device enabled latch.

2. Background

In electronic assemblies and systems, where user access is desirable or field repair may be required, there exists a possibility of inducing damage to electronic circuits through electrostatic discharge (ESD). Best practices for minimizing damage due to ESD are known, but observance of those practices in the field may be difficult or impossible. As a result, damage may occur to circuitry which may result in adverse effects on system operation where access is gained to a circuit or assembly without employing ESD practices or procedures.

It would, therefore, be advantageous to provide for proper ESD handling of electronic assemblies and systems, modules and circuits by providing an electrostatic discharge prevention device enabled latch to be incorporated in the design of electronic assemblies and modules where access or entry to an electronic device is controlled by a latched access, panel, door or the like. Additionally, it may be desirable to incorporate an ESD ground strap as a portion of the electrostatic discharge prevention device enabled latch.

SUMMARY OF THE INVENTION

The present invention is directed to an electrostatic discharge prevention device enabled latch. The electrostatic discharge prevention device enabled latch may be employed on or with an enclosure including an access panel attached to the enclosure. The enclosure with the access panel closed forms a Faraday cage protecting the contents from ESD. Opening the access panel exposes the contents to ESD. The electrostatic discharge prevention device enabled latch includes a latch for retaining an access panel in a closed position. The latch may be disengaged by operation of a latch release member which functions to effect release or disengagement of the latch. A conductor receptacle is attached to the enclosure, typically in the proximity of the access panel and is in electrical contact with the enclosure which is in turn typically conductively connected to the enclosure contents through some finite resistance. An electrostatic discharge prevention device, including a ground strap or static dissipative mat and a conductive terminal, are provided for use by an individual desiring to gain access through the access panel to service enclosed components or circuits. When the conductive terminal is inserted into the conductor receptacle, a latch release member is displaced disengaging the latch.

The conductive terminal and the conductor receptacle may be configured as any cooperating conductive terminal and receptacle combination. In one preferred embodiment of the invention, the conductive terminal and the conductor receptacle are configured as a standard "banana" jack.

The latch release member may be configured as a sliding bolt which reciprocatingly contacts the latch and mechanically effects disengagement of the latch. The sliding bolt protrudes into the conductor receptacle and is displaced by the insertion of the conductive terminal. The latch is spring biased towards an engaged position for retaining the access panel in a closed position until released by operation of the conductive terminal against the sliding bolt. Alternately, the latching mechanism may be configured as a latch retainer switch, which electrically switches a latch operator such as a solenoid or motor to effect operation of the latch in response to the position of the latch retainer switch. The latch retainer switch protrudes into the conductor receptacle and is displaced by the insertion of the conductive terminal. In this case, when the latch retainer switch is displaces and closes the switch circuit, a latch operator is signaled and activated to disengage the latch allowing access to the enclosure. When the conductive terminal is withdraw, the latch retainer switch returns to a biased open position and the latch may be engaged.

DETAILED DESCRIPTION OF THE INVENTION

Figure 1:
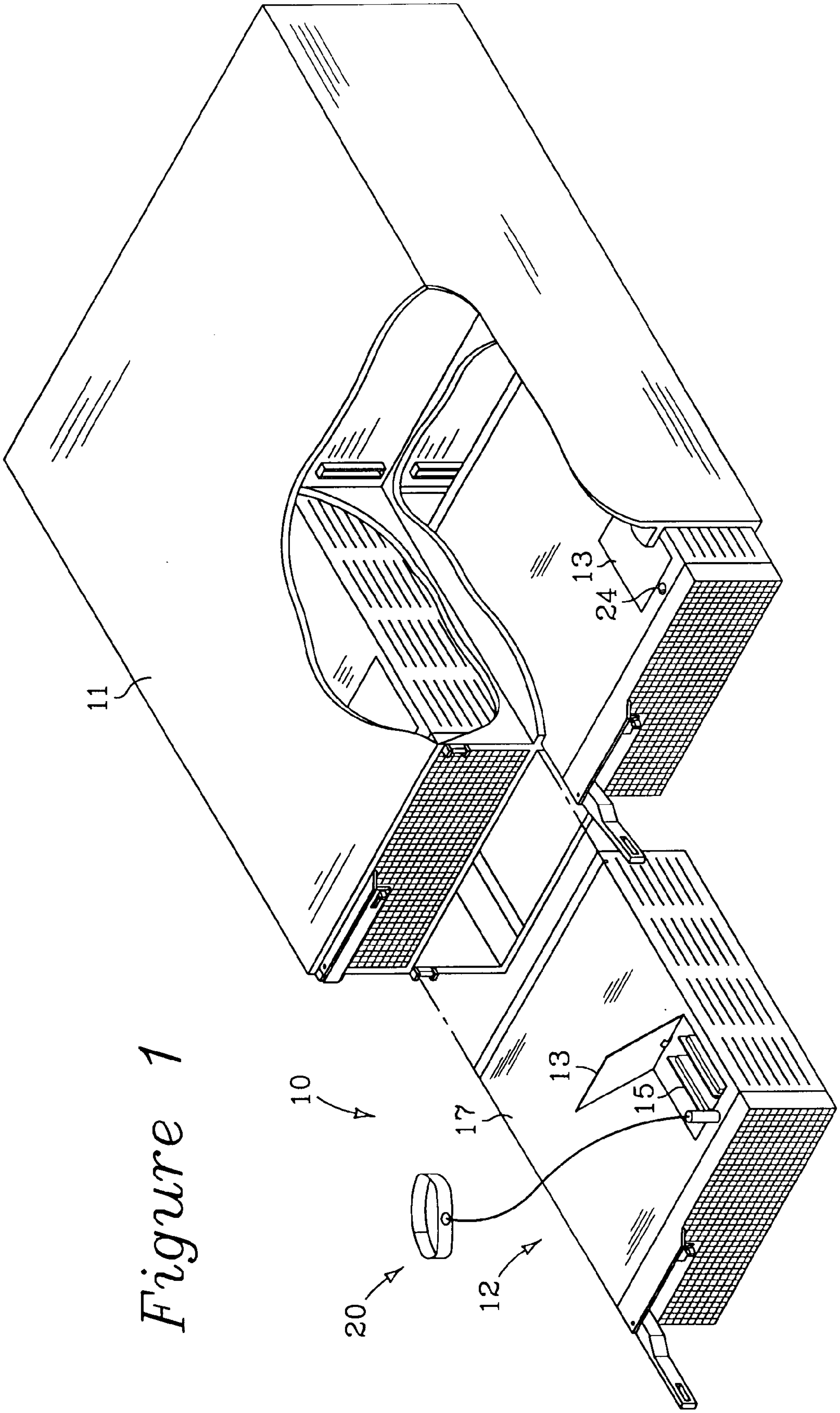
FIG. 1 is a perspective representational view of an enclosure including an electrostatic discharge prevention device enabled latch according to the present invention.

Referring to FIGS. 1 through 5, electrostatic discharge prevention device enabled latch 10 will be more fully described. FIG. 1 shows electronic assembly 11 including enclosure 12. Enclosure 12 includes access panel 13. Electrostatic discharge prevention device enabled latch 10 provides controlled access to enclosure 12.

Figure 3:
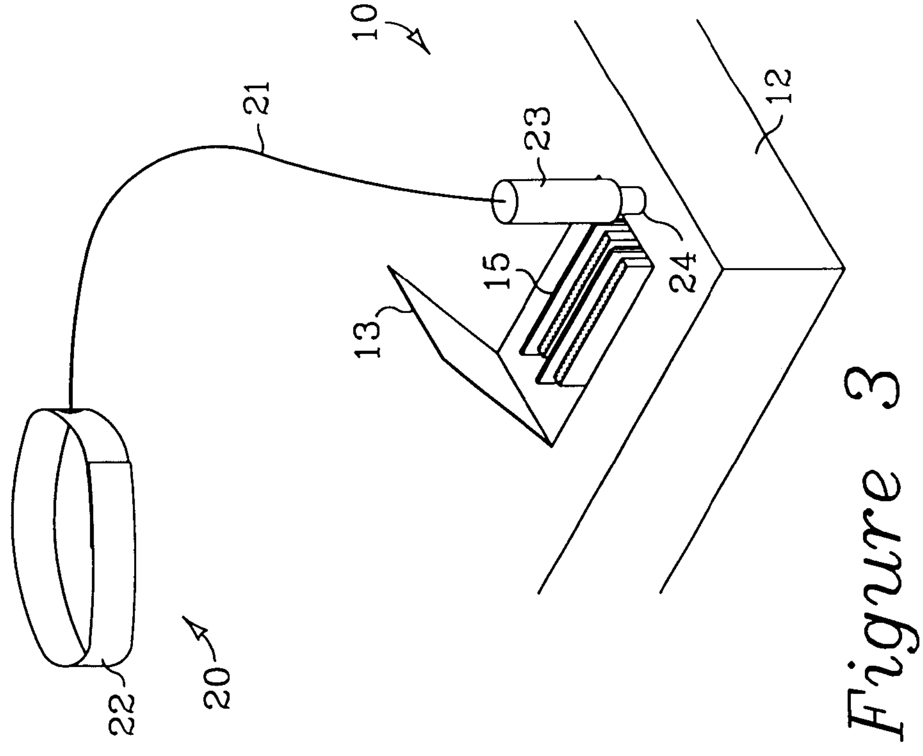
FIG. 3 is a perspective representational view of an electrostatic discharge prevention device enabled latch according to the present invention.
Figure 2:
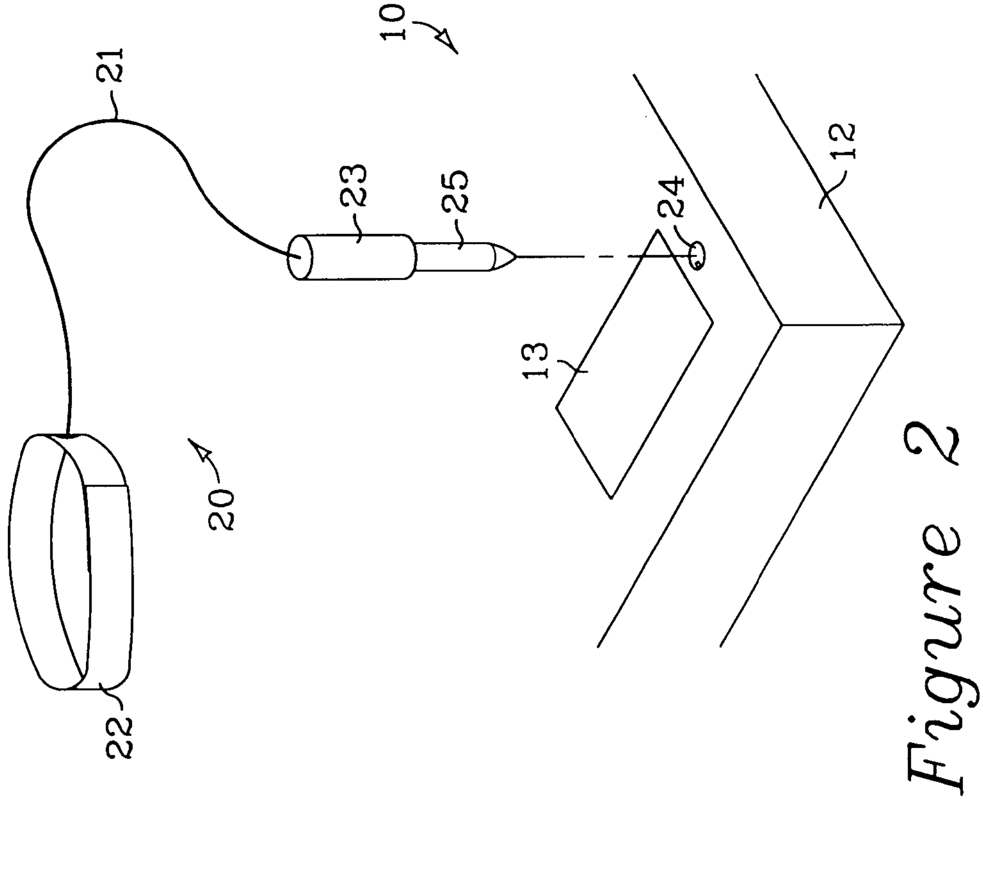
FIG. 2 is a perspective representational view of an electrostatic discharge prevention device enabled latch according to the present invention.

Referring to FIGS. 2 and 3, enclosure 12 is shown including access panel 13 shown in a closed position in FIG. 2 and in an open position in FIG. 3. Electrostatic discharge prevention device enabled latch 10 includes electrostatic discharge prevention device 20 having conductor 21, conductively connecting ground strap 22 to terminal 23. Terminal 23 includes conductor 25 which is insertable into conductor receptacle 24 as shown in FIG. 2. As shown in FIG. 3, when conductor 25 is inserted into conductor receptacle 24 access panel 13 will open making accessible electronic package 15.

Figure 4:
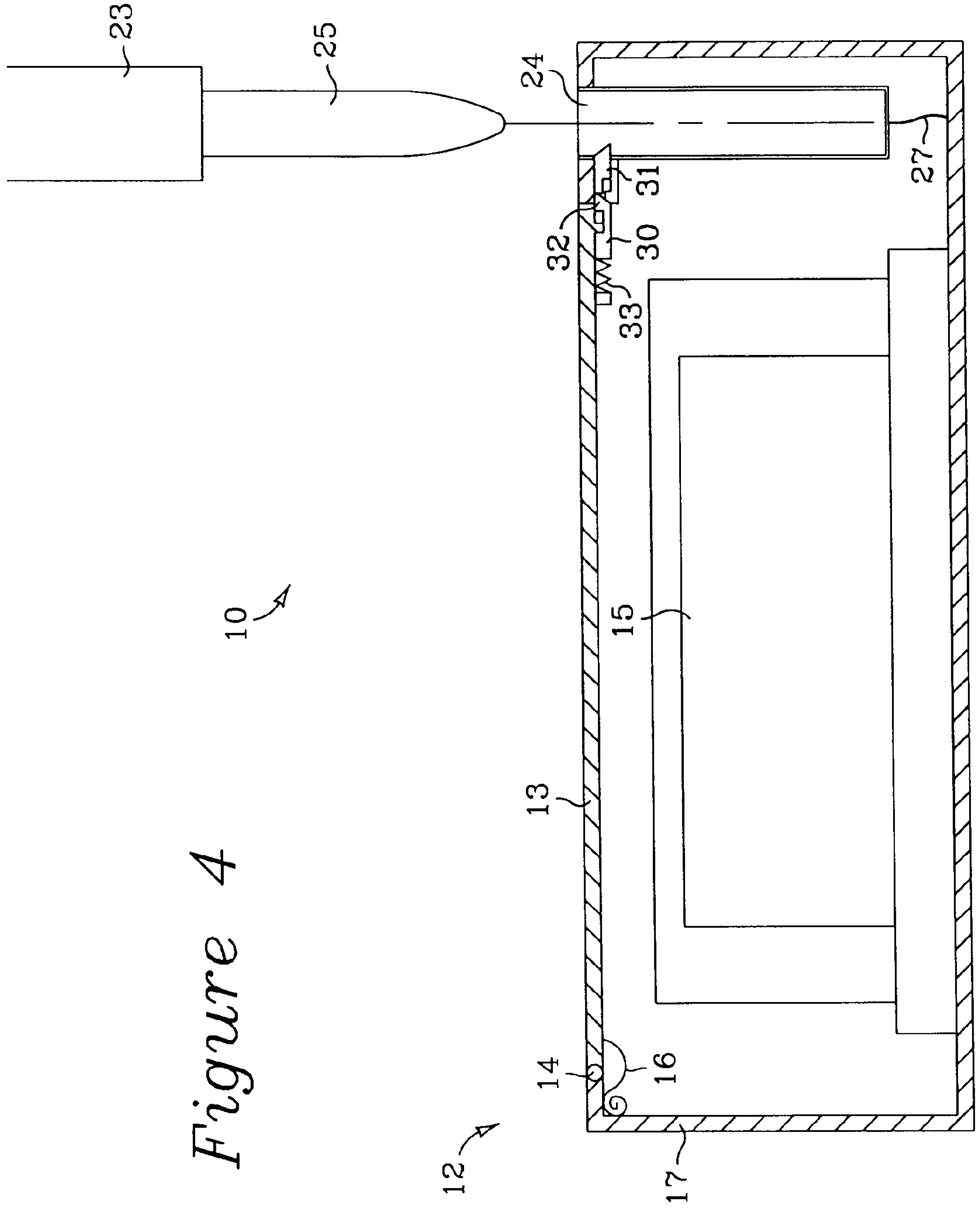
FIG. 4 is a representational side cutaway view of an enclosure including an electrostatic discharge prevention device enabled latch according to the present invention.
Figure 5:
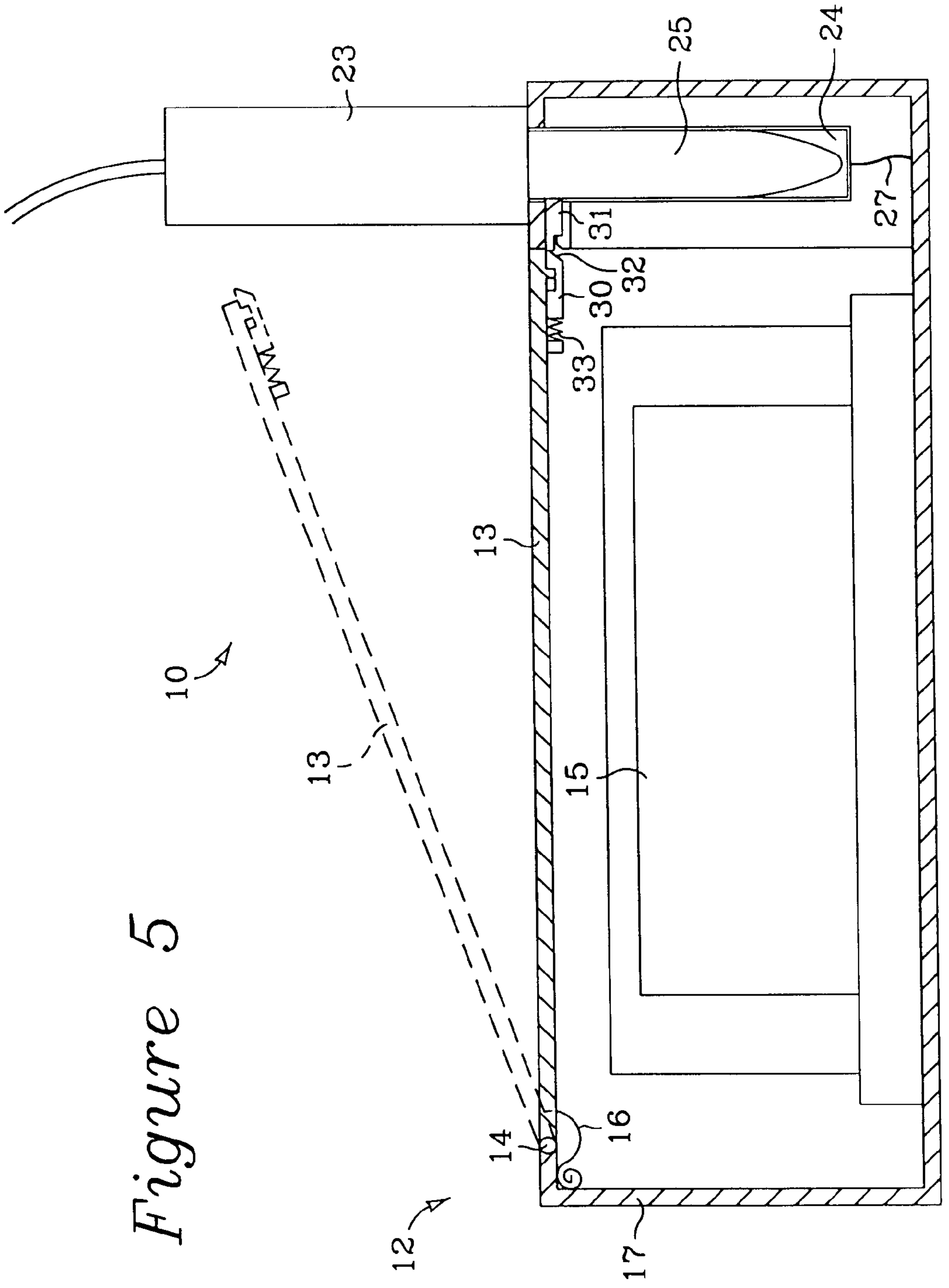
FIG. 5 is a representational side cutaway view of an enclosure including an electrostatic discharge prevention device enabled latch according to the present invention.

Referring to FIGS. 4 and 5 enclosure 12 is shown including access panel 13 pivotable in relationship to housing 17 of enclosure 12 at hinge 14. Access panel 13 is shown in a closed position in FIG. 4 and in an open position in FIG. 5. Access panel 13 is biased towards an open position by spring 16. Conductor 25 of terminal 23 is shown insertable into conductor receptacle 24 as shown in FIG. 4. Conductor receptacle 24 is conductively attached to housing 17 of enclosure 12 by conductor 27. As shown in FIG. 5, when conductor 25 of terminal 23 is inserted into conductor receptacle 24 access panel 13 will open making accessible, electronic package 15.

FIGS. 4 and 5 show latch 30 which reciprocates in connection with bolt 31. As conductor 25 of terminal 23 is inserted into conductor receptacle 24, conductor 25 of terminal 23 displaces bolt 31 which in turn acts against latch 30, moving latch 30 to a disengaged position, wherein lip 32 of latch 30 is pushed inside of the edge of housing 17. Latch 30 is biased in towards an engaged position by spring 33 as shown in FIG. 4. Bolt 31 in this case is passive and reciprocates in relationship with the biased latch 30 and the insertion or removal of conductor 25.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. An electrostatic discharge prevention device enabled latch for an enclosure including an access panel attached to the enclosure comprising:

a latch;

a latch release member connected to the latch;

a conductor receptacle attached to the enclosure, the latch release member projecting within the conductor receptacle; and an electrostatic discharge prevention device including a conductive terminal connected to a ground strap, the conductive terminal insertable into the conductor receptacle for displacing the latch release member.

2. The electrostatic discharge prevention device enabled latch of claim 1 wherein the latch release member further comprises a bolt contacting the latch to effect operation of the latch in response to the position of the bolt.

3. The electrostatic discharge prevention device enabled latch of claim 1 wherein the latch release member further comprises a latch retainer switch electrically connected to a latch operator to effect operation of the latch in response to the position of the latch retainer switch.

4. The electrostatic discharge prevention device enabled latch of claim 1 wherein the electrostatic discharge prevention device further comprises a conductor having a ground strap attached at a first end and a conductive terminal attached at a second end.

5. The electrostatic discharge prevention device enabled latch of claim 1 wherein the electrostatic discharge prevention device further comprises a conductor having a static dissipative mat attached at a first end and a conductive terminal attached at a second end.

6. An electrostatic discharge prevention device enabled latch assembly comprising:

an enclosure including an access panel attached to the enclosure, a latch connected to the enclosure;

a latch release member connected to the latch;

a conductor receptacle attached to the enclosure, the latch release member projecting within the conductor receptacle; and an electrostatic discharge prevention device including a conductive terminal connected to a ground strap, the conductive terminal insertable into the conductor receptacle for displacing the latch release member.

7. The electrostatic discharge prevention device enabled latch of claim 6 wherein the latch release member further comprises a bolt contacting the latch to effect operation of the latch in response to the position of the bolt.

8. The electrostatic discharge prevention device enabled latch of claim 6 wherein the latch release member further comprises a latch retainer switch electrically connected to a latch operator to effect operation of the latch in response to the position of the latch retainer switch.

9. The electrostatic discharge prevention device enabled latch of claim 6 wherein the electrostatic discharge prevention device further comprises a conductor having a ground strap attached at a first end and a conductive terminal attached at a second end.

10. The electrostatic discharge prevention device enabled latch of claim 6 wherein the electrostatic discharge prevention device further comprises a conductor having a static dissipative mat attached at a first end and a conductive terminal attached at a second end.

* * * * *